United States Patent [19]
Victor

[11] Patent Number: 5,390,718
[45] Date of Patent: Feb. 21, 1995

[54] ARRANGEMENT FOR RETAINING A TIRE ON A VEHICLE WHEEL

[75] Inventor: Carl-Gustav Victor, Höllviken, Sweden

[73] Assignee: Trelleborg Tyre AB, Trelleborg, Sweden

[21] Appl. No.: 975,927

[22] Filed: Feb. 10, 1993

[30] Foreign Application Priority Data

Jun. 12, 1991 [SE] Sweden .................... 9101782

[51] Int. Cl.⁶ .......................................... B60C 15/028
[52] U.S. Cl. ................................. 152/400; 152/375; 152/399
[58] Field of Search ................ 152/379.3, 384, 385, 152/399, 400

[56] References Cited

U.S. PATENT DOCUMENTS

| | | | |
|---|---|---|---|
| 2,028,601 | 1/1936 | Hall | 152/20 |
| 2,409,666 | 10/1946 | Comey | 152/399 |
| 3,669,174 | 6/1972 | Mills | 152/375 |
| 3,965,957 | 6/1976 | Nakasaki | 152/400 |
| 4,016,917 | 4/1977 | Victor | 152/400 |
| 4,151,870 | 5/1979 | Watts | 152/375 |

FOREIGN PATENT DOCUMENTS

| | | | |
|---|---|---|---|
| 418481 | 9/1975 | Sweden . | |
| 222768 | 10/1924 | United Kingdom | 152/400 |

Primary Examiner—Russell D. Stormer
Attorney, Agent, or Firm—Nils H. Ljungman & Associates

[57] ABSTRACT

An arrangement for retaining a tire on a vehicle wheel. The arrangement has a device for locking a tire against the wheel rim and pressing the tire beads against the rim flanges and rim seats. The device for locking the tire includes a plurality of clamping jaws disposed in spaced-apart relation to one another about the rim. Each jaw is rotatable about a clamping bolt. The rim of the wheel is provided, on its bottom, with fixing lugs. The jaws, when in an operative position, are applied against the fixing lugs to prevent the jaws from rotating about their clamping bolt.

18 Claims, 2 Drawing Sheets 5,390,718

ARRANGEMENT FOR RETAINING A TIRE ON A VEHICLE WHEEL

This application is a Continuation-In-Part application of International Application No. PCT/SE92/00395, filed on Jun. 11, 1992, which claims priority from Swedish Patent Application No. 9101782-2, filed on Jun. 12, 1991. International Application No. PCT/SE92/00395 was pending as of the filing date of U.S. application Ser. No. 07/975,927 and the U.S. was an elected state in International Application No. PCT/SE92/00395.

BACKGROUND OF THE INVENTION

1. Field of the Invention

The present invention generally relates to wheel rim constructions which permit a tire to undergo severe loading, or endure heavy duty conditions, and also permit the tire to run in a deflated state.

2. Background Information

Attempts have earlier been made, particularly in connection with cross-country vehicles, to design rim constructions which permit running with the tire under severe loading or heavy duty conditions, and also running with the tire in a deflated state, commonly referred to as run-flat driving. Examples of known constructions are given in SE-B-317,003, SE-B-362,219, DE-1,505,080, U.S. Pat. No. 2,028,601, U.S. Pat. No. 2,409,666, U.S. Pat. No. 4,151,870, U.S. Pat. No. 3,664,405, U.S. Pat. No. 3,669,174, U.S. Pat. No. 4,572,265 and SE-B-418,481 (=U.S. Pat. No. 4,016,917).

The construction disclosed in SE-B-418,481 relies on jaws or bead clamps which are elongate and which extend, when in their operative position, in the axial direction of the vehicle wheel to press the tire beads against the rim flanges. The bead clamps are retained in place by a clamping bolt passing through the rim bottom and mechanically pressing the bead clamps against the rim bottom, whereby to obtain a stable and strong engagement. These prior-art bead clamps have proved most useful and reliable for many types of vehicle tire.

It has however been found that these bead clamps may sometimes tend to rotate about the clamping bolt, particularly under heavy duty conditions and especially when using tires having a large axial width, particularly low-profile tires for forest machines and other cross-country vehicles. In fact, the purpose of the bead clamps is to mechanically fix the tire on the rim to prevent it from slipping thereon, also in the case of low air pressure. Another purpose of the bead clamps is to prevent air leakage between the tire beads and the rim flanges as a result of the tire beads coming loose from the rim flanges when the tire is subjected to high lateral stresses. If the bead clamps should rotate about the clamping bolt, the intended fixation of the tire would be undone.

Objects of the Invention

One object of the present invention therefore is to provide an arrangement in vehicle wheels which reduces or completely obviates the risk of unintentional rotation of the bead clamps.

Another object of the invention is to provide an arrangement in vehicle wheels which increases the capacity of the vehicle wheel to take up very high lateral forces. Such lateral forces occur especially in wheels for cross-country forest machines.

Yet another object of the invention is to provide an arrangement in vehicle wheels which increases the ability of the wheel to ensure air tightness in the areas where the tire beads engage the rim flanges and the tire bead seat, also at low air pressures in tubeless tire designs.

A further object of the invention is to improve the device disclosed in SE-B-418,481 (=U.S. Pat. No. 4,016,917) and to make it easier to mount and correctly position the bead clamps on the vehicle wheel.

Summary of the Invention

These and other objects of the invention are achieved by means of an arrangement in vehicle wheels as defined in claim 1. The dependent claims recite particularly preferred embodiments of the invention.

In the invention, use is made of a number of jaws or bead clamps for securing a pneumatic tire on the rim. These jaws or bead clamps are elongate and rotatable, and are disposed, when in the operative position, with their longitudinal axis in the axial direction of the vehicle wheel. The jaws or bead clamps are pressed both against the tire beads in order to apply these against the rim flanges, and against the rim bottom in order to stabilise the jaws or bead clamps and to eliminate or substantially reduce the risk of tilting of the jaws or bead clamps because of heavy impacts in the circumferential direction of the vehicle wheel. The jaws or bead clamps are retained by means of a clamping bolt which is connected to the jaws or bead clamps and extends through a hole in the rim bottom. The clamping bolt is disposed at a location between the ends of the jaws or bead clamps, preferably fairly centrally so as to enable requisite pivotal movement of both ends of the jaw or bead clamp when mounting and dismounting the tire. To prevent unintentional rotation of the jaws or bead clamps about their clamping bolts, the rim bottom has, in accordance with the invention, been provided or formed with fixing lugs, against which the jaws or bead clamps abut when mounted.

To prevent unintentional pivotal movement of the jaws or bead clamps, it suffices that each bead clamp or jaw is associated with two fixing lugs or ridges. These two fixing lugs or ridges may be located on the same side of the associated jaw or bead clamp, however offset in different directions away from the clamping bolt of the jaw or bead clamp. Another option is to use two fixing lugs, one on each side of the jaw or bead clamp at a certain distance from the clamping bolt. For optimum results and for achieving a highly reliable mounting, it is preferred to use four fixing lugs, arranged pairwise on each side of the jaw or bead clamp, the two pairs being disposed on each side of the clamping bolt and at a distance therefrom.

Within the scope of the invention, it is also possible to use fixing lugs which are elongate in the axial direction of the vehicle wheel so as to define a valley between them, in which the jaw or bead clamp is disposed when mounted.

To ensure that The jaws or bead clamps are conveniently guided into place when being mounted, the top side of the fixing lugs is preferably rounded or bevelled. This can easily be achieved if using fixing lugs formed of metal rods having round or semicircular cross-section, which are welded to the rim bottom.

When the bead clamps or jaws are to be used in a tubeless tire construction, air tightness is ensured where the clamping bolt passes through the rim bottom by arranging a suitable seal of elastomeric material or other sealing material around the clamping bolt between the rim bottom and the jaw or bead clamp.

In the invention, use is preferably made of jaws or bead clamps having a fixed length. Within the scope of the invention, it is however also possible to use jaws or bead clamps of expandable type according to the disclosure of SE-B-418,481. This publication therefore is included in this description by reference.

BRIEF DESCRIPTION OF THE DRAWINGS

The invention will be described in more detail hereinbelow in a currently preferred embodiment.

FIG. 1 shows a rim 10 having reinforced rim seats 11 and rim flanges 12. The reinforcement consists of a welded angle section 13. The rim has a rim disc or spoke structure 14. A vehicle tire 15 is mounted on the rim, such that the tire beads 16 engage the rim seats 11 and also the rim flanges 12. The tire beads are pressed firmly against the rim flanges 12 by means of bead clamps 17 which are arranged in spaced-apart relationship around the rim. In ordinary cases, e.g. six or eight evenly distributed bead clamps can be used. Only one of the clamps is however shown in the drawings.

Figure 1:
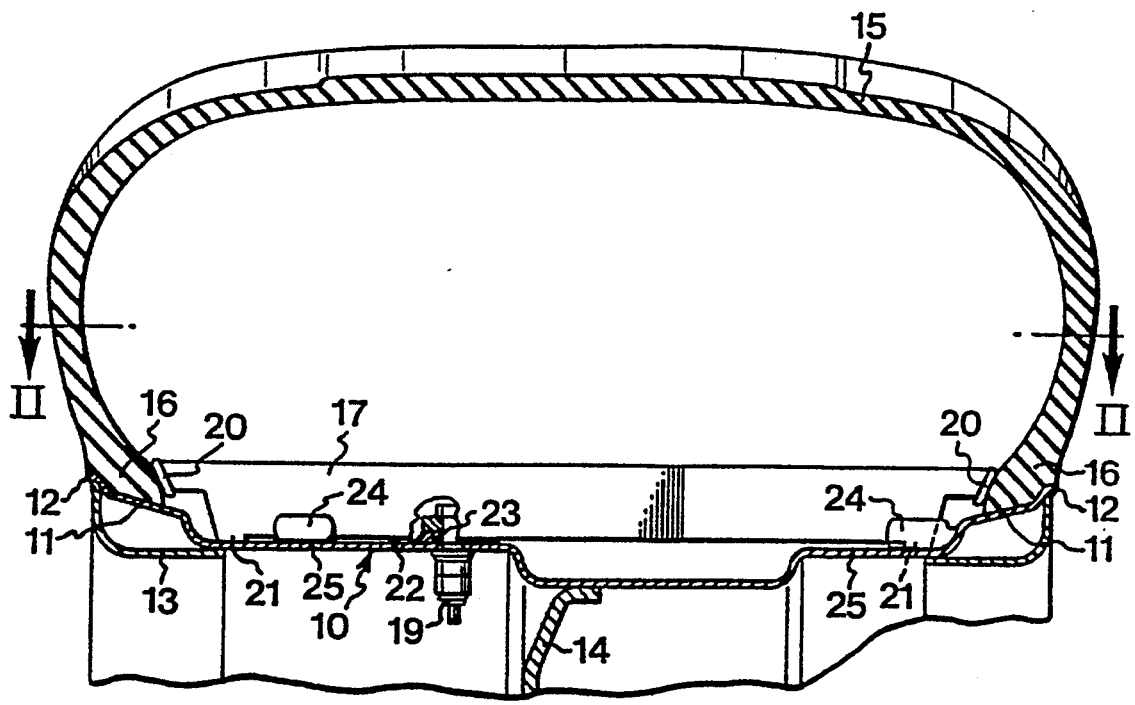
FIG. 1 is a radial section of a vehicle wheel according to the invention.
Figure 2:
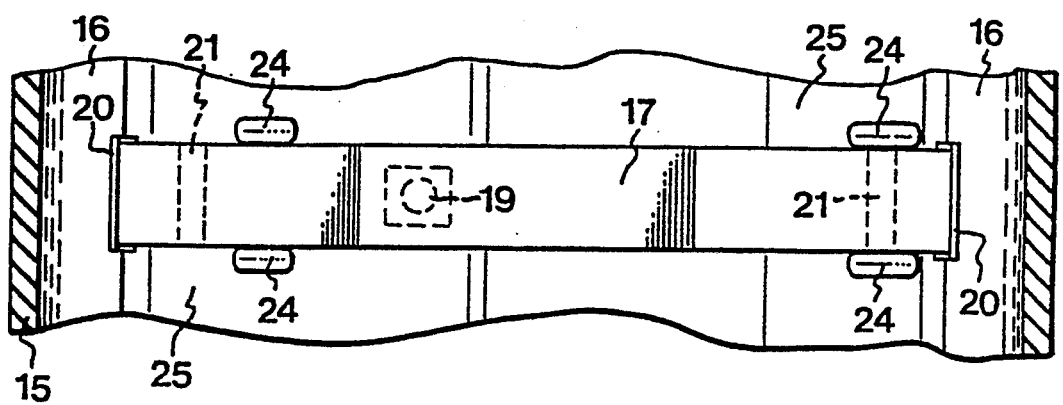
FIG. 2 is a section taken along the line II—II in FIG. 1.
Figure 3:
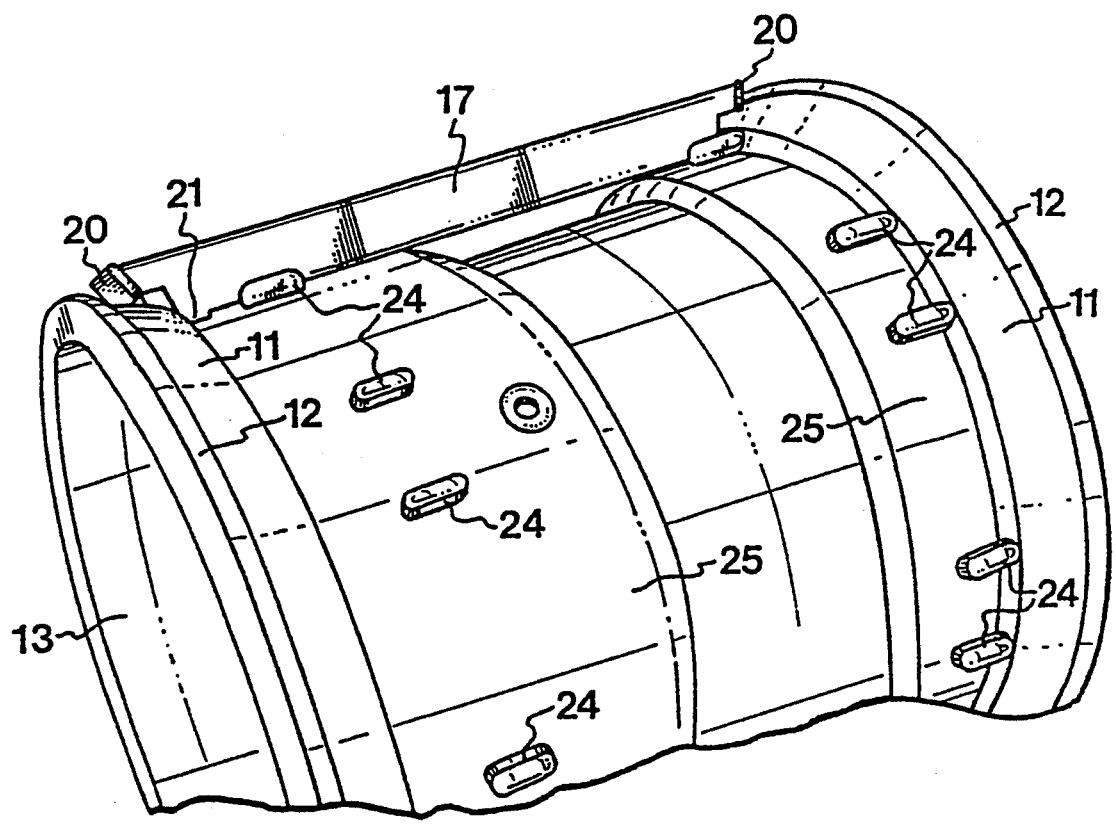
FIG. 3 is a perspective view showing parts of a rim and a bead clamp mounted thereon.

The bead clamp shown in the drawings consists of a welded box girder of sheet metal with a clamping bolt 19 fastened thereon. At the ends Of the bead clamp, there are provided clamping surfaces 20 which are pressed against the tire beads 16, and also abutment surfaces 21 which are pressed against the rim bottom. The bead clamps also have a sealing surface 22 which is pressed against a suitable rubber or plastic gasket 23 engaging the rim bottom so as to ensure air tightness around the clamping bolts 19.

According to the invention, the rim 10 has a number of fixing lugs or ridges 24 which in the illustrated embodiment consist of short round pieces of steel, also having rounded ends and being welded to the rim bottom. The lugs 24 are arranged pairwise on both sides of the bead clamp 17 to prevent it from being unintentionally rotated about the clamping bolt when subjected to high stresses. In this embodiment, one pair of lugs has been disposed adjacent the rim seat 11 while the other pair has been disposed some distance away from the opposite rim seat 11 to make room for one tire bead when mounting and dismounting the tire.

One way of mounting the tire 15 on the rim 10 is to first force one of the tire beads over one of the rim flanges 12, whereupon the bead clamps are passed into the tire and into their fixing holes, the bead clamps 17 being so turned that the longitudinal direction of the bead clamps roughly coincide with the plane of rotation of the rim. The bead clamps are thus swung about 60°–90° with respect to the position shown in the drawings. After applying the nut on the fixing bolt projecting through the rim bottom, the bead clamp is pressed as far into the tire as possible while maintaining this orientation. The other tire bead is thereafter forced over the rim flange, and the tire is inflated, e.g. to about 500 kPa. The bead clamps are thereafter swung to the position shown in the drawings and pulled down against the rim by tightening the nut. By the provision of the fixing lugs 24, the bead clamp is forcedly guided into its intended operative position. When the nut has been completely tightened, the tire beads 16 will be sealingly pressed against the rim flanges 12 and the rim seats 11 at the same time as the gasket 23 is compressed and the abutment surfaces 21 are urged into firm mechanical engagement with the rim bottom 25.

As earlier mentioned, the bead clamps may be expandable in the longitudinal direction, as stated in SE-B418,481. The same advantages are obtained in this case by the use of the fixing lugs 24.

In the event of a puncture, the bead clamps, as in the device according to SE-B-418,481, will maintain the tire beads clamped against the rim seats and the rim flanges with a force replacing the clamping force exerted by the air pressure. When using extreme low-profile tires, as on forest machines, this clamping force brought about by the bead clamps may also supplement the clamping action of the air pressure, so as to give the tire a considerably improved capacity to withstand high lateral loads as a result of the lugs 24 preventing the bead clamps from turning about the clamping bolts.

Moreover, the clamping of the tire beads prevents the tire from slipping on the rim, which in turn means that the tire can transmit driving and braking forces also when punctured. In this manner, the mobility of the vehicle both under cross-country conditions and on roads will largely remain unaltered, also in the event of a puncture. By the design of the bead clamps, which thus are not to be compared to the known run-flat rings provided on the inner side of the rim, it is possible to achieve sufficient clamping to permit running the tires at extremely low air pressures in cases where, for example, additional carrying capacity or additional traction is required for driving on very loose ground. Moreover, the clamps permit using tubeless tires also under cross-country conditions, without the risk of slow leaks because of foreign matter penetrating in between the tire wall and the rim flange. A major advantage gained by the clamp beads being designed to mechanically abut both on the rim bottom and on the tire beads is that the bead clamps are stabilised and prevented from breaking or tilting or being rotated as a result of the substantial stresses which arise in run-flat driving.

If, moreover, use is made of the bead clamps in combination with a lubricant, it is possible to run punctured tires over long distances. If the damage to the tire is only caused by pointed weapons or small-bore arms, it is in fact not necessary to dismount the tire from the rim but simply to plug the hole, whereupon the tire is inflated and again becomes functional.

In fact, the bead clamps in the construction according to the invention are so effective that the tire is retained on the rim even if it were to be blown up by running over a landmine. Since the tire remains on the rim despite such serious damage, it is possible to continue using the damaged tire for transmitting driving power and braking forces and imparting carrying capacity to the wheel. Of course, a damaged tire retained of the rim is better than the rim alone.

Another substantial advantage of the construction according to the invention is that a split rim need not be used for mounting the bead clamps, i.e. these fit both flat-base rims and drop center rims.

All, or substantially all, of the components and methods of the various embodiments may be used with at least one embodiment or all of the embodiments, if any, described herein.

All of the patents, patent applications, and publications recited herein, if any, are hereby incorporated by reference as if set forth in their entirety herein.

The details in the patents, patent applications, and publications may be considered to be incorporable, at applicant's option, into the claims during prosecution as further limitations in the claims to patentably distinguish any amended claims from any applied prior art.

The appended drawings, in their entirety, including all dimensions, proportions and/or shapes in at least one embodiment of the invention, are, if applicable, accurate and to scale and are hereby incorporated by reference into this specification.

The invention as described hereinabove in the context of the preferred embodiment is not to be taken as limited to all of the provided details thereof, since modifications and variations thereof may be made without departing from the spirit and scope of the invention.

I claim:

1. Arrangement in a vehicle wheel with a pneumatic tire mounted on a rim, said arrangement comprising means for locking the tire against the rim and pressing the tire beads against the rim flanges and the rim seats, said means having a plurality of clamping jaws disposed in spaced-apart relationship around the rim and rotatable in the interior of the vehicle wheel, said jaws being elongate and each having a single clamping bolt which extends through the bottom of the rim, and being oriented, when in their operative position, with the longitudinal axis in the axial direction of the rim and being so dimensioned and designed as to be pressed, by means of the clamping bolt, both:

directly against the two beads of the vehicle tire in order, by means of their end surfaces, to press the tire beads outwards against the rim flanges and against the rim seats, and against the bottom of the rim in a stabilising and sealing manner, wherein the rim has a bottom, and the rim is provided on its bottom with fixing lugs, against which the jaws are applied when in their operative position to prevent the jaws from rotating about their clamping bolt.

2. Arrangement as claimed in claim 1, wherein the fixing lugs are arranged pairwise on each side of the associated jaw.

3. Arrangement as claimed in claim 2, wherein the fixing lugs are arranged on both sides of and spaced from the clamping bolt of each jaw, as seen in the axial direction of the rim.

4. Arrangement according to claim 3, wherein:
the bottom of the rim has a hole,
the fixing lugs, on one side of the hole in the rim bottom, are disposed adjacent the rim flange, and
the fixing lugs at the other end of the jaws are located in a position between the hole and the other rim flange at a distance therefrom.

5. Arrangement according to claim 4, wherein the side of the fixing lugs facing away from the rim bottom is rounded for guiding the jaws into the intended operative position when mounting them.

6. Arrangement according to claim 5, wherein the jaws are sealingly pressed against the bottom of the rim by the intermediary of an elastic gasket disposed around the clamping bolt between the jaw and the rim bottom.

7. The arrangement according to claim 6, wherein:
each of said jaws has means for simultaneously being sealingly pressed against the tire beads and the rim bottom;

said fixing lugs comprise four fixing lugs;
each of said jaws has two opposite ends with respect to the longitudinal axis of said jaw;
said four fixing lugs are arranged in two pairs, each of said pairs of fixing lugs are disposed towards opposite ends of said jaw;
the vehicle wheel has a circumferential direction defined circumferentially about a periphery of the vehicle wheel;
each of said fixing lugs has a first linear dimension and a second linear dimension, the first linear dimension being parallel to the axial direction of the vehicle wheel and the second linear dimension being generally parallel to the circumferential direction of the vehicle wheel;
said first linear dimension of each of said fixing lugs is substantially elongated with respect to said second linear dimension of said fixing lug;
each of said pairs of fixing lugs comprises a valley for accommodating a corresponding jaw, said valley for being disposed, at each of said pairs of fixing lugs, between a first fixing lug of each of said pairs of fixing lugs and a second fixing lug of each of said pairs of fixing lugs;
each of said fixing lugs is welded to the rim bottom;
one of said pairs of fixing lugs is disposed immediately adjacent a corresponding one of the rim seats;
the other of said pairs of fixing lugs is spaced substantially apart from the other one of the rim seats;
each said jaw comprises two clamping surfaces, each of said clamping surfaces having means for pressing against a corresponding one of the tire beads;
each said jaw comprises a plurality of abutment surfaces having means for pressing against the rim bottom, each said abutment surface being integral with said jaw and for extending downwardly from said jaw;
said arrangement is configured for:
clamping the tire beads to prevent slippage of the tire on the rim;
enabling the transmission of driving and braking forces from the tire subsequent to a puncturing of the tire;
clamping, on the rim, a tire having a substantially low air pressure;
clamping a tubeless tire on the rim;
clamping a tire on a flat-based rim; and
clamping a tire on a drop-center rim.

8. The arrangement according to claim 2, wherein the side of the fixing lugs facing away from the rim bottom is rounded for guiding the jaws into the intended operative position when mounting them.

9. The arrangement according to claim 8, wherein the jaws are sealingly pressed against the bottom of the rim by the intermediary of an elastic gasket (23) disposed around the clamping bolt between the jaw and the rim bottom.

10. The arrangement according to claim 9, wherein:
the fixing lugs are arranged on both sides of and spaced from the clamping bolt of each jaw, as seen in the axial direction of the rim;
the fixing lugs, on one side of the hole in the rim bottom, are disposed adjacent the rim flange, while the fixing lugs at the other end of the jaws are located in a position between the hole and the other rim flange (12) at a distance therefrom;

each of said jaws has means for simultaneously being sealingly pressed against the tire beads and the rim bottom;

said fixing lugs comprise four fixing lugs;

each of said jaws has two opposite ends with respect to the longitudinal axis of said jaw;

said four fixing lugs are arranged in two pairs, each of said pairs of fixing lugs being disposed towards opposite ends of said jaw;

the vehicle wheel has a circumferential direction defined circumferentially about a periphery of the vehicle wheel;

each of said fixing lugs has a first linear dimension and a second linear dimension, the first linear dimension being parallel to the axial direction of the vehicle wheel and the second linear dimension being generally parallel to the circumferential direction of the vehicle wheel;

said first linear dimension of each of said fixing lugs is substantially elongated with respect to said second linear dimension of said fixing lug;

each of said pairs of fixing lugs comprises a valley for accommodating a corresponding jaw, said valley for being disposed, at each of said pairs of fixing lugs, between a first fixing lug of each of said pairs of fixing lugs and a second fixing lug of each of said pairs of fixing lugs;

each of said fixing lugs is welded to the rim bottom;

one of said pairs of fixing lugs is disposed immediately adjacent a corresponding one of the rim seats;

the other of said pairs of fixing lugs is spaced substantially apart from the other one of the rim seats;

each said jaw comprises two clamping surfaces, each of said clamping surfaces has means for pressing against a corresponding one of the tire beads;

each said jaw comprises a plurality of abutment surfaces having means for pressing against the rim bottom, each said abutment surface being integral with said jaw and for extending downwardly from said jaw;

said arrangement is configured for:
  clamping the tire beads to prevent slippage of the tire on the rim;
  enabling the transmission of driving and braking forces from the tire subsequent to a puncturing of the tire;
  clamping, on the rim, a tire having a substantially low air pressure;
  clamping a tubeless tire on the rim;
  clamping a tire on a flat-based rim; and
  clamping a tire on a drop-center rim.

11. The arrangement according to claim 1, wherein the side of the fixing lugs facing away from the rim bottom is rounded for guiding the jaws into the intended operative position when mounting them.

12. The arrangement according to claim 11, wherein the jaws are sealingly pressed against the bottom of the rim by the intermediary of an elastic gasket (23) disposed around the clamping bolt (19) between the jaw and the rim bottom.

13. The arrangement according to claim 12, wherein:
the fixing lugs are arranged pairwise on each side of the associated jaw;
the fixing lugs are arranged on both sides of and spaced from the clamping bolt of each jaw, as seen in the axial direction of the rim;
the fixing lugs, on one side of the hole in the rim bottom, are disposed adjacent the rim flange, while the fixing lugs at the other end of the jaws are located in a position between the hole and the other rim flange at a distance therefrom;

each of said jaws has means for simultaneously being sealingly pressed against the tire beads and the rim bottom;

said fixing lugs comprise four fixing lugs;

each of said jaws has two opposite ends with respect to the longitudinal axis of said jaw;

said four fixing lugs are arranged in two pairs, each of said pairs of fixing lugs being disposed towards opposite ends of said jaw;

the vehicle wheel has a circumferential direction defined circumferentially about a periphery of the vehicle wheel;

each of said fixing lugs has a first linear dimension and a second linear dimension, the first linear dimension being parallel to the axial direction of the vehicle wheel and the second linear dimension being generally parallel to the circumferential direction of the vehicle wheel;

said first linear dimension of each of said fixing lugs is substantially elongated with respect to said second linear dimension of said fixing lug;

each of said pairs of fixing lugs comprises a valley for accommodating a corresponding jaw, said valley for being disposed, at each of said pairs of fixing lugs, between a first fixing lug of each of said pairs of fixing lugs and a second fixing lug of each of said pairs of fixing lugs;

each of said fixing lugs is welded to the rim bottom;

one of said pairs of fixing lugs is disposed immediately adjacent a corresponding one of the rim seats;

the other of said pairs of fixing lugs is spaced substantially apart from the other one of the rim seats;

each said jaw comprises two clamping surfaces, each of said clamping surfaces having means for pressing against a corresponding one of the tire beads;

each said jaw comprises a plurality of abutment surfaces for pressing against the rim bottom, each said abutment surface being integral with said jaw and for extending downwardly from said jaw;

said arrangement is configured for:
  clamping the tire beads to prevent slippage of the tire on the rim;
  enabling the transmission of driving and braking forces from the tire subsequent to a puncturing of the tire;
  clamping, on the rim, a tire having a substantially low air pressure;
  clamping a tubeless tire on the rim;
  clamping a tire on a flat-based rim; and
  clamping a tire on a drop-center rim.

14. The arrangement according to claim 1, wherein the fixing lugs are arranged on both sides of and spaced from the clamping bolt of each jaw, as seen in the axial direction of the rim.

15. The arrangement according to claim 14, wherein the fixing lugs, on one side of the hole in the rim bottom, are disposed adjacent the rim flange, while the fixing lugs at the other end of the jaws are located in a position between the hole and the other rim flange at a distance therefrom.

16. The arrangement according to claim 15, wherein the side of the fixing lugs facing away from the rim bottom is rounded for guiding the jaws into the intended operative position when mounting them.

17. The arrangement according to claim 16, wherein the jaws are sealingly pressed against the bottom of the rim by the intermediary of an elastic gasket disposed around the clamping bolt between the jaw and the rim bottom.

18. The arrangement according to claim 17, wherein:
the fixing lugs are arranged pairwise on each side of the associated jaw;
each of said jaws has means for simultaneously being sealingly pressed against the tire beads and the rim bottom;
said fixing lugs comprise four fixing lugs;
each of said jaws has two opposite ends with respect to the longitudinal axis of said jaw;
said four fixing lugs are arranged in two pairs, each of said pairs of fixing lugs being disposed towards opposite ends of said jaw;
the vehicle wheel has a circumferential direction defined circumferentially about a periphery of the vehicle wheel;
each of said fixing lugs has a first linear dimension and a second linear dimension, the first linear dimension being parallel to the axial direction of the vehicle wheel and the second linear dimension being generally parallel to the circumferential direction of the vehicle wheel;
said first linear dimension of each of said fixing lugs is substantially elongated with respect to said second linear dimension of said fixing lug;
each of said pairs of fixing lugs comprises a valley for accommodating a corresponding jaw, said valley for being disposed, at each of said pairs of fixing lugs, between a first fixing lug of each of said pairs of fixing lugs and a second fixing lug of each of said pairs of fixing lugs;
each of said fixing lugs is welded to the rim bottom;
one of said pairs of fixing lugs is disposed immediately adjacent a corresponding one of the rim seats;
the other of said pairs of fixing lugs is spaced substantially apart from the other one of the rim seats;
each said jaw comprises two clamping surfaces, each of said clamping surfaces having means for pressing against a corresponding one of the tire beads;
each said jaw comprises a plurality of abutment surfaces having means for pressing against the rim bottom, each said abutment surface being integral with said jaw and for extending downwardly from said jaw;
said arrangement is configured for:
clamping the tire beads to prevent slippage of the tire on the rim;
enabling the transmission of driving and braking forces from the tire subsequent to a puncturing of the tire;
clamping, on the rim, a tire having a substantially low air pressure;
clamping a tubeless tire on the rim;
clamping a tire on a flat-based rim; and
clamping a tire on a drop-center rim.

* * * * *

UNITED STATES PATENT AND TRADEMARK OFFICE
CERTIFICATE OF CORRECTION

PATENT NO. : 5,390,718
DATED : February 21, 1995
INVENTOR(S) : Carl-Gustav B.C. VICTOR It is certified that error appears in the above-indentified patent and that said Letters Patent is hereby corrected as shown below:

On the title page, after item [22], insert the following Continuing Application Data:

--Related International Application Data
[63] Continuation-in-part of International Application No. PCT/SE92/00395, filed on June 11, 1992.--.

In column 1, after the title, insert the following heading:
--CONTINUING APPLICATION DATA--.

In column 1, line 42, after 'vehicle', delete "tire" and insert --tires--.

In column 3, after line 17, insert the following heading:
--DESCRIPTION OF THE PREFERRED EMBODIMENTS--.

Signed and Sealed this

Thirty-first Day of December, 1996

Attest:

BRUCE LEHMAN

*Attesting Officer*   *Commissioner of Patents and Trademarks*